United States Patent
Lerman et al.

(10) Patent No.: US 6,431,573 B1
(45) Date of Patent: Aug. 13, 2002

(54) AUTOMATIC TRANSMISSION FOR A CYCLE, SUCH AS A BICYCLE, AND A CYCLE HAVING SUCH AS TRANSMISSION

(75) Inventors: Victor S. Lerman, Malden; Harry H. Lerman, Everett; David M. Otten, Newton, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/752,153

(22) Filed: Dec. 29, 2000

(51) Int. Cl.[7] ................................................ B62M 9/10
(52) U.S. Cl. ........................................ 280/261; 474/162
(58) Field of Search ................................ 280/259, 260, 280/261; 474/160, 162, 163

(56) References Cited

U.S. PATENT DOCUMENTS

| | | |
|---|---|---|
| 3,592,081 A | 7/1971 | Schwerdhofer |
| 3,648,547 A | 3/1972 | Schwerdhofer |
| 3,701,292 A | 10/1972 | Schulz |
| 3,830,521 A | 8/1974 | Gardel et al. |
| 3,837,234 A | 9/1974 | Chao |
| 3,867,851 A | * 2/1975 | Gregory et al. ............. 474/163 |
| 3,926,020 A | 12/1975 | Dantowitz et al. |
| 3,948,112 A | 4/1976 | Gilbert |
| 3,969,948 A | 7/1976 | Pipenhagen, Jr. |
| 4,098,147 A | 7/1978 | Waddington |
| 4,257,519 A | * 3/1981 | Leach ........................ 198/834 |
| 4,352,503 A | 10/1982 | Cotter |
| 4,598,920 A | 7/1986 | Dutil et al. |
| 4,642,070 A | 2/1987 | Walker |
| 4,671,783 A | 6/1987 | Seymour |
| 4,713,042 A | 12/1987 | Imhoff |
| 4,741,546 A | 5/1988 | Reswick |
| 4,781,663 A | 11/1988 | Reswick |
| 4,836,046 A | 6/1989 | Chappel |
| 4,850,939 A | 7/1989 | Chilcote |
| 4,878,883 A | 11/1989 | Wheless |
| 4,952,196 A | 8/1990 | Chilcote et al. |
| 4,961,719 A | 10/1990 | Wildermuth |
| 5,163,881 A | 11/1992 | Chattin |
| 5,251,504 A | 10/1993 | Summerville et al. |
| 5,295,916 A | 3/1994 | Chattin |
| 5,303,605 A | 4/1994 | Douglass |
| 5,407,395 A | 4/1995 | Kraemer |
| 5,445,567 A | 8/1995 | Chattin |
| 5,454,766 A | 10/1995 | Mills |
| 5,582,555 A | 12/1996 | Miller |
| 5,772,546 A | 6/1998 | Warszewski |
| 5,895,336 A | 4/1999 | Yoo |

\* cited by examiner

Primary Examiner—Kevin Hurley
(74) Attorney, Agent, or Firm—Steven J. Weissburg

(57) ABSTRACT

A shifting mechanism for a bicycle or other wheeled cycle has at least two gear wheels, of which at least one is segmented. The segments are movable into and out of a driving position. Motion of the segments occurs at a circumferential location out of the driving zone, at a location where the driving band, typically a chain, is not contacting the segment. The shifting mechanism can be provided at the front chain ring, or at the rear, gear sprocket. For a front chain wheel, the free zone is generally the rearward half of the chain ring, while for the rear gear sprocket, the free zone is generally the forward half. The moving segments can be toothed gates which flip perpendicularly to the plane in which the chain resides. The gates may be actuated by a moving mechanism powered by an actuator, such as a D.C. motor, under control of a signal processor, such as a microprocessor. The signal processor also takes as an input a speed signal based on the rotational speed of the cycle wheels, or the cadence of the pedal or a combination thereof.

10 Claims, 14 Drawing Sheets

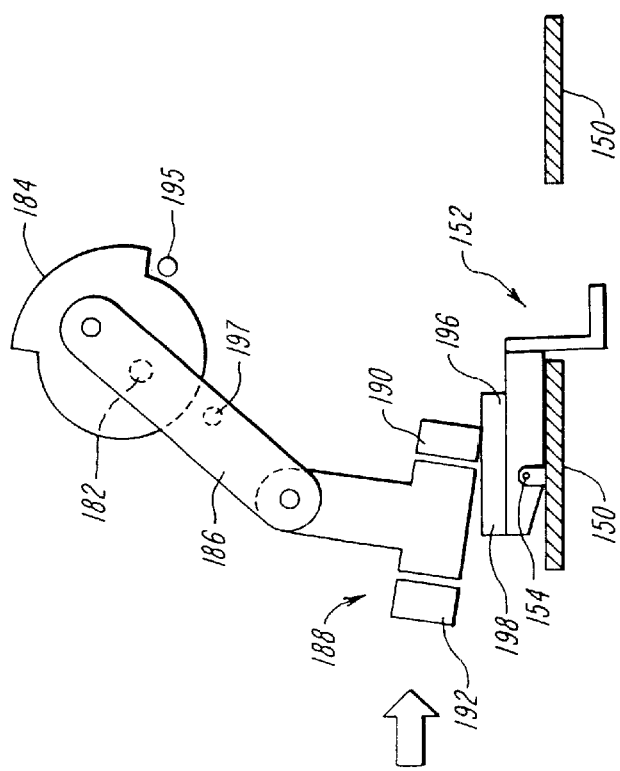
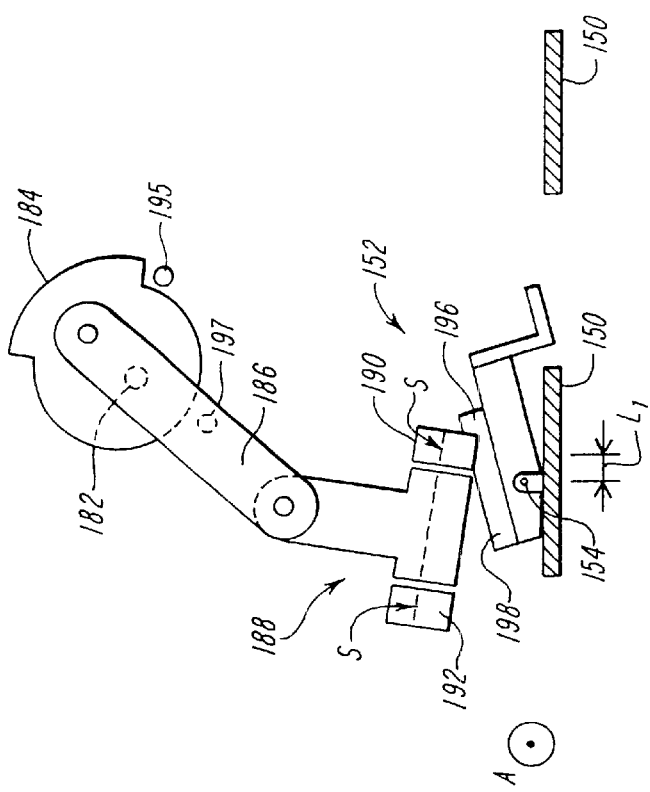
FIG. 5A
FIG. 5B

AUTOMATIC TRANSMISSION FOR A CYCLE, SUCH AS A BICYCLE, AND A CYCLE HAVING SUCH AS TRANSMISSION

BACKGROUND

This invention relates to human powered vehicles in general, and to automatic transmissions therefor, in particular.

Human powered cycles, such as bicycles, and some tricycles, often have a variable speed transmission. With known bicycles, such as shown in FIG. 1, there are various types of variable transmission. Internal rear hub transmissions, typically 3 speed, are known. With such transmissions, the rider rotates pedals 10 that are connected to a chain ring 12 through a crank 11, which, in turn, through a chain 14, is connected to a rear wheel sprocket 16. The sprocket is connected through a variable internal hub transmission (not shown) to the wheel 18. (FIG. 1 is a composite, showing aspects of various, different types of prior art transmissions. It does not show the internal hub transmission or a cable thereto, but, rather, shows a type of rear wheel transmission that is described below. Since the internal hub type transmission is well known, and not germane to the invention, it is not shown specifically. FIG. 1 is used herein only to show where such known, internal hub transmissions reside.) The internal workings of the hub change according to controls manually manipulated by the user, such as through a handlebar-mounted lever that connects to the hub through a cable.

Another popular type of known transmission, such as shown with reference to FIG. 1, employs a multi-sprocket rear cartridge 18, for instance mounted on the rear hub 16, having several, typically between three and eight variable diameter sprockets 20. A rear derailleur 22 engages the chain 14, as described above, and, again under manual control of the operator, typically through a cable 24, moves the chain from engagement with one of the sprockets to another. By changing the active sprocket to one with a different diameter, the gear ratio of the operable transmission elements is changed. A larger rear sprocket 20 reduces the effort required to rotate the rear wheel 26 against a load, and is typically referred to as a "lower gear." A smaller rear sprocket 20 increases the effort required to rotate the rear wheel against a load, but also increases the circumferential distance covered by the rear wheel for a single rotation of the pedals 10, and is referred to as a "higher gear." Typically, the cable moves the derailleur such that it directs the chain from a higher to a lower gear while a spring within the derailleur returns the chain from a lower to a higher gear when the user relaxes the tension on the cable by moving a lever.

A similar type of transmission also employs a set of sprockets having different diameters, but, rather than being mounted on the rear hub, such varying diameter sprockets 28 are coupled directly to the pedal assembly, so that one rotation of the pedals causes one full rotation of the front sprockets 28. The sprockets are typically referred to as chain ring sets. A front derailleur 30 engages the chain 14, and, again under manual control of the operator, typically through a cable (not shown), moves the chain 14 from engagement with one of the chain rings 32 to another 34. By changing the active chain ring to one with a different diameter, the gear ratio of the operable transmission elements is changed. A larger 32 front chain ring 28 increases the effort required to rotate the rear wheel 26 against a load, and is typically referred to as a "higher gear." A smaller 34 front chain ring 28 decreases the effort required to rotate the rear wheel against a load, but also decreases the circumferential distance covered by the rear wheel for a single rotation of the pedals 14, and is referred to as a "lower gear." Typically, the cable moves the derailleur such that it directs the chain from a lower to a higher gear while a spring within the derailleur returns the chain from a higher to a lower gear when the user relaxes the tension on the cable by moving a lever.

Thus, a higher gear is obtained by engaging a smaller rear sprocket 18 or a larger front chain ring 28. A lower gear is obtained by engaging a larger rear sprocket or a smaller front chain ring.

Often, bicycles use both a front and rear derailleur type transmission, thereby obtaining a large number of effective gear ratios, equal to the product of the number of rear sprockets 18 times the number of front chain rings 28. However, often, some of the gear ratio combinations are very nearly equal to others of the combinations, and often the extreme combinations, such as the largest rear sprocket and the largest front chain ring (which would result in an intermediate gear ratio) are not comfortably obtained without the chain rubbing excessively on the chain ring and sprocket. Thus, a nominally eighteen speed transmission (six rear sprockets and three front chain rings) might have only eight to ten significantly different gear ratios.

There are other types of transmissions also, which are known to the art.

All of the above mentioned transmissions are typically available in a manual embodiment, in which the user decides when to change gears ("shift gears") and does so by manually moving some element of the transmission system. Typically, the movable element is a lever near the front of the bicycle. Over the years, many different types of levers have been used. (For purposes of illustration, only, several types are shown in FIG. 1. Only one type would be present for any actual bicycle.) A popular three speed-internal hub transmission used a single handle mounted lever (not shown). Other cartridge and chain ring models use levers 40 mounted on the handle bars, or 42 on the down tube and 44 at the ends of the handle bar tubes (both lever and rotary types). A relatively recent configuration incorporates the gear shift levers into handles 46 that are also part of the braking assembly. With some models, a unitary lever actuates both a brake and a gear shift, while in others, tandem, nested levers are used, one for braking and one for shifting. Some shifting lever mechanisms use one lever for shifting from a lower gear to a higher gear, and another for the reverse direction.

A problem with all of the conventional transmissions that use a rear cartridge 18 or/and a front set of chain rings 28, is that shifting the chain from one toothed gear wheel to another, when shifting from a higher to a lower gear, such as when climbing a hill, typically occurs at a time when the user wants to be applying power to the transmission. However, if power is applied at the wrong moment, as the chain is intermediate between one ring and another, the next chain ring does not pick up the chain, and the shifting mechanism malfunctions. The result is grinding and wear of all of the components, as well as loss of power and momentum, which often necessitates shifting to an even lower gear. There are some semi-automated shifting mechanisms which delay the actual shifting until the components are aligned properly to avoid missing.

One reason that gear missing occurs is that the chain is being moved adjacent the gear wheels, right at the circumferential location around the gear wheel where the chain engages the gear wheel, and where power is transmitted from the gear wheel to the chain (front gear wheels), or vice versa (rear gear wheels). In other words, the chain is removed from the first gear wheel within the driving zone, and is deposited onto the next gear wheel within the driving zone. As shown in FIG. 1, the "driving zone" is roughly the forward half of the chain ring (for a front chain ring), indicated between the arrows $D_z$. (For a rear chain ring sprocket, the driving zone is roughly the rearward half.)

Force is generated between the chain and the chain ring in part due to the torque applied by the user pushing on the pedals, and in part by the tension in the chain, which is established by a spring in the rear derailleur 22. Thus, as the chain is moving over toward the chain ring, torque is being applied by the pedals to the chain ring. If there is no engagement between the chain and the chain ring, then no load resists the torque and the chain wheel just spins. Or more commonly, if the engagement is positive, but less than some a minimum degree, the chain is not retained by the chain wheel, and the chain wheel spins while the teeth grind against the chain links, thereby eventually damaging both, as well as failing to apply power to the task of moving the cycle.

Another drawback with conventional systems is that the user must decide when to shift. Many users are not skilled at making such decisions, and make the decision at the wrong time. Further, the user must manually make the move. This requires, in most cases, removing the hand from the normal driving position, and moving it to a shifting mechanism. In the case of down tube, and centrally mounted handle bar shifters, the shifting hand can no longer control the handlebars. This is the reason for the popularity of bar end and brake mechanism shifters. However, bar end shifters are often very stiff, and awkward to actuate. Brake mechanism shifters are very expensive, fragile, and mechanically complicated.

Automatic shifting transmissions have been proposed with many different forms of mechanisms, attempting to solve the foregoing problems. None have been commercially successful, and the reasons are too many and various to explore here. Many have mechanisms that actuate in the driving zone and must move against the resistance of a driving band (typically a chain) as power is applied to it by the user. Many have complicated or delicate mechanisms that cannot withstand the harsh environment cycles, particularly bicycles, encounter. Many cannot be adequately governed, or require large forces to shift the gears.

Another drawback of many of the known automatic shifting mechanisms, is that they can not be retrofitted onto the millions of existing bicycles. In fact, some designs cannot even be used on a conventional bicycle frame, but require special configurations of the supports and stays.

Thus, the several objects of the present invention include to provide a shifting mechanism for a human powered wheeled cycle, particularly a bicycle, which is not prone to slipping when shifting. Another object is to provide a shifting mechanism that can be simply and reliably automated, so that the user need not decide when to shift, or displace his/her hands from the driving position to make the shift. Another object of the invention is to provide a shifting mechanism that can be automated, which can be retrofitted onto existing bicycles, and that can be incorporated into new bicycles with standard frames. Another object of the invention is to provide a transmission with the foregoing properties, which is economical to manufacture and maintain.

SUMMARY

In general, according to the present invention, a shifting mechanism for a cycle, such as a bicycle, is provided that has at least two gear wheels, of which at least one is segmented. The segments are movable into and out of a driving position. Motion of the segments occurs at a circumferential location out of the driving zone, at a location where the driving band, typically a chain, is not contacting the segment. The shifting mechanism can be provided at the front chain ring, or at the rear, gear sprocket. For a front chain wheel, the free zone is generally the rearward half of the chain ring, while for the rear gear sprocket, the free zone is generally the forward half. The moving segments can be toothed gates which flip perpendicularly to the plane in which the chain resides. The gates may be actuated by a moving mechanism powered by an actuator, such as a D.C. motor, under control of a signal processor, typically a microprocessor. The signal processor also takes as an input a speed signal based on the rotational speed of the cycle wheels, or the cadence of the pedal or a combination thereof.

A preferred embodiment of the invention is a transmission for a bicycle, the transmission comprising a variable configuration gear wheel, having components that move relative to each other from a first position to a second position, where, in the second position, the movable components engage a bicycle chain in a driving position. The movable components are configured and arranged so that the relative motion takes place only in a free zone where the chain and movable components are free of each other. The movable components are arranged such that when any movable component engages the chain, the movable component is stationary relative to all except, at most, one other of the movable components. The variable configuration gear wheel may be a front chain wheel, in which case the free zone is a zone behind the chain wheel, generally between it and a rear wheel of the bicycle. Alternatively, the variable configuration gear wheel may be a rear sprocket wheel, in which case the free zone is a zone ahead of the sprocket wheel, generally between it and a chain wheel of the bicycle.

The movable component is movable to the second position along a path having a component that is perpendicular to a plane in which the chain lies. The transmission also includes a mover mechanism to move each of the movable components to the second position. Either the same, or another mover mechanism moves each of the movable components from the second to the first position.

Another preferred embodiment of the invention is a transmission component for a cycle having a driving crank and a driven wheel, torque being transmitted from the driving crank through a bracket, that is coupled thereto, to the wheel by an endless power band that engages the transmission component at a driving zone and that is free from the transmission component at a free zone. The transmission component is coupled to the bracket and comprises a variable configuration ring assembly that comprises: a support and, coupled to the support, a plurality of ring components. Each ring component is movable from a driving position to a non-driving position. Each of the ring components comprises at least one band engaging elements around a perimeter. The ring components are arranged such that, if the ring component is in the driving position, then the band engaging elements: form an outermost, segmented band ring; are driven circumferentially if the crank is moved in a driving direction; lie in a driving plane; and engage the band in the driving zone but are free from the band in the free zone. The ring components are also arranged such that, if the ring component is not in the driving position, then the band engaging elements lie out of the driving plane and are free from the band in both the driving zone and in the free zone.

Typically, each ring component has a couple to the support that constrains relative motion of the ring component such that motion of the ring component from the non-driving position to the driving position has a vector component that is perpendicular to the driving plane.

A version of this embodiment of the invention further has a ring component mover, arranged and operative to move at least one of the ring components from the non driving position to the driving position only when the ring component is in the free zone. There may be a single mover for each ring component, one for all, or more than one mover may handle some but not all of the ring components.

A typical embodiment of the invention further comprises a radially innermost band ring, having a plurality of band engaging elements around a perimeter. The innermost band ring is coupled by the bracket to the driving crank such that the band engaging elements: are driven circumferentially if the crank is driven circumferentially; lie in the driving plane; and engage the band in the driving zone and are free from the band in the free zone, if the innermost band ring engages the band.

In a very useful embodiment of the invention, the cycle is a bicycle, and the wheel comprises a rear wheel of the bicycle. Typically, the endless band comprising a roller chain, the band engaging elements being sized and shaped to engage links of the chain. Alternatively, the endless band may be a posi-drive type belt, the band engaging elements being sized and shaped to engage the posi-drive type belt.

In many embodiments, the ring components are arranged such that when engagement with the band commences, the ring component is fully in the driving position and is not moving from the non-driving position to the driving position.

According to another embodiment of the invention, the outermost plurality of ring components are designated "gates." The invention further comprises, a gate mover, operative to move at least one of the gates, only where the at least one gate is in the free zone: from the non-driving position to the driving position; and from the driving position to the non-driving position. As mentioned above, there may be one gate mover for all of the outermost gates, or one for each, or more than one, each of which handles some, but not all, of the gates.

The innermost band ring is arranged relative to the outer band ring such that if the innermost band ring engages a band, and the ring components of the outer band ring are sequentially moved from the non-driving position to the driving position, then the band transfers from the innermost band ring to the outer band ring by engagement with the moved ring components. Conversely, if the outer band ring engages a band, and the ring components of the outer band ring are sequentially moved from the driving position to the non-driving position, then the band transfers from the outer band ring to the innermost band ring.

In a preferred embodiment, a hinge couples each gate to the support.

The plurality of gates are typically located such that the segmented outermost band ring circumscribes the innermost band ring if the outermost gates are in the driving position.

According to an embodiment of the invention that provides more speed possibilities, the transmission further comprises a radially intermediate segmented band ring, carried by the support, so that it is also driven circumferentially if the crank is driven circumferentially. The intermediate band ring comprises a plurality of intermediate movable gates, each of the plurality of intermediate gates carrying at least one band engaging elements along a peripheral region. Each of the plurality of intermediate gates are movable from a non-driving position with the band engaging elements out of the driving plane, to a driving position with the band engaging elements in the driving plane, such that the intermediate band engaging elements engage the band in the driving zone and are free from the band in the free zone if the intermediate band ring engages the band. For the plurality of intermediate gates, there is at least one gate mover, operative to move each the intermediate gate, only where the gate is in the free zone. The gate mover is operative to move the gates from the non-driving position to the driving position and from the driving position to the non-driving position. The plurality of intermediate gates are located such that the intermediate segmented band ring circumscribes the innermost band ring, and is circumscribed by the outermost segmented band ring if the intermediate and outermost movable gates are in the driving position.

In a typical preferred embodiment, the gate mover is movable. Each of the gates comprises a gate placer, arranged to be contacted by the gate mover. The gate placer may comprise an angled ramp, carried by the gate. Each of the gates also typically comprises a gate picker, which may also be an angled ramp carried by the gate, arranged to be contacted by the gate mover. The gate mover may have a placer trigger that is movable to contact the gate placer of a gate when the gate is in the free zone and a picker trigger that is movable to contact the gate picker when the gate is in the free zone.

In still another preferred embodiment, the gate mover is movable at selectable times to a placing position in which it contacts the gate as the gate passes by the gate mover, thereby causing the gate to move from the non-driving position to the driving position. The gate mover may be movable to the placing position by a cable linkage. More typically, the gate mover is movable to the placing position at selectable times based on a rotational velocity of the driven wheel. In such a case, the invention further comprises a sensor which, upon activation, generates a signal that corresponds to rotational velocity of the driven wheel. Coupled to the sensor is an outer ring actuator, actionable to move the gate mover to the placing position at times that the rotational velocity of the driven wheel increases to an outermost upshift velocity.

In a specifically preferred embodiment of the invention, the gate mover is further movable at selectable times to a picking position in which it contacts the gate as the gate passes by the gate mover, thereby causing the gate to move from the driving position to the non-driving position. The gate mover is also movable to the picking position at selectable times based on a rotational speed of the driven wheel. Typically, the outermost actuator is further actionable to move the gate mover to the picking position at times that the rotational velocity of the driven wheel decreases to an outermost downshift velocity. It is helpful if the outermost downshift velocity is less than the outermost upshift velocity.

In an embodiment, as described above, having an outermost, innermost, and intermediate band rings, the intermediate gate mover is also typically movable, for both picking and placing, by an intermediate gate actuator at times based on wheel velocity, with upshift and downshift velocities that are coordinated with the upshift and downshift velocities for the outermost band ring. The intermediate upshift velocity is less than the outermost upshift velocity.

According to another beneficial aspect of the invention, there is a controller that controls actuation of the outer ring actuator. The controller may be a microprocessor. The ring actuator may be a D.C. motor, a servo motor, or a solenoid. A particularly useful type of D.C. motor is a small, 1.5 volt motor having copper wipers.

A preferred aspect of the invention is a transmission for a cycle, according to any of the embodiments described above, either as a retrofit or as an original equipment feature. Also an aspect of the invention is an entire bicycle, or other type cycle, employing any of the embodiments of the transmission of the invention described above.

BRIEF DESCRIPTION OF THE DRAWINGS

These and other features, aspects, and advantages of the present invention will become better understood with regard to the following description, appended claims and accompanying drawings, where:

FIG. 4A shows the chain being carried by the smallest chain ring;

FIG. 4B shows the chain being carried by the smallest chain ring with an intermediate gate moved into a driving position, while two intermediate gates and two largest diameter gates remain in a non-driving position;

FIG. 4C shows the chain being carried by the intermediate chain ring configuration while two largest diameter gates remain in a non-driving position;

FIG. 4D shows the chain being carried by the largest chain ring with a largest gate moved into a driving position, while one largest diameter gate remains in a non-driving position;

FIG. 4E shows the chain being carried by the largest diameter chain ring configuration;

FIG. 5A shows schematically a gate and gate mover, as the gate mover contacts the gate just before the gate moves from a non-driving position to a driving position;

FIG. 5B shows schematically a gate and gate mover, as the gate mover contacts the gate just after the gate moves from a non-driving position to a driving position;

DETAILED DESCRIPTION

Figure 1:
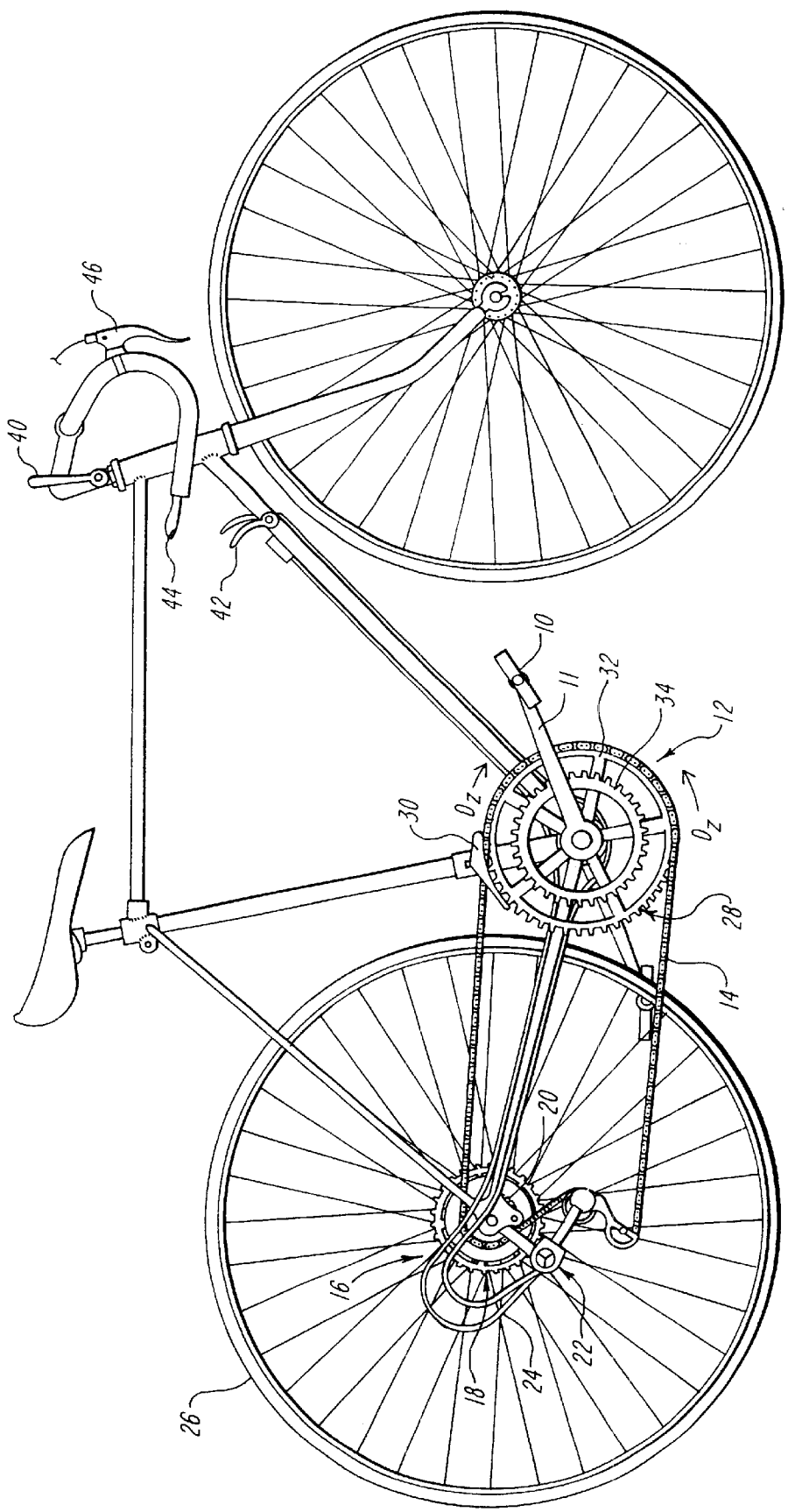
FIG. 1 (Prior art) is an idealized representation of a conventional touring bicycle frame, equipped with front and rear derailleurs, and front and rear gear sprocket sets, along with various gear shifting levers.
Figure 2:
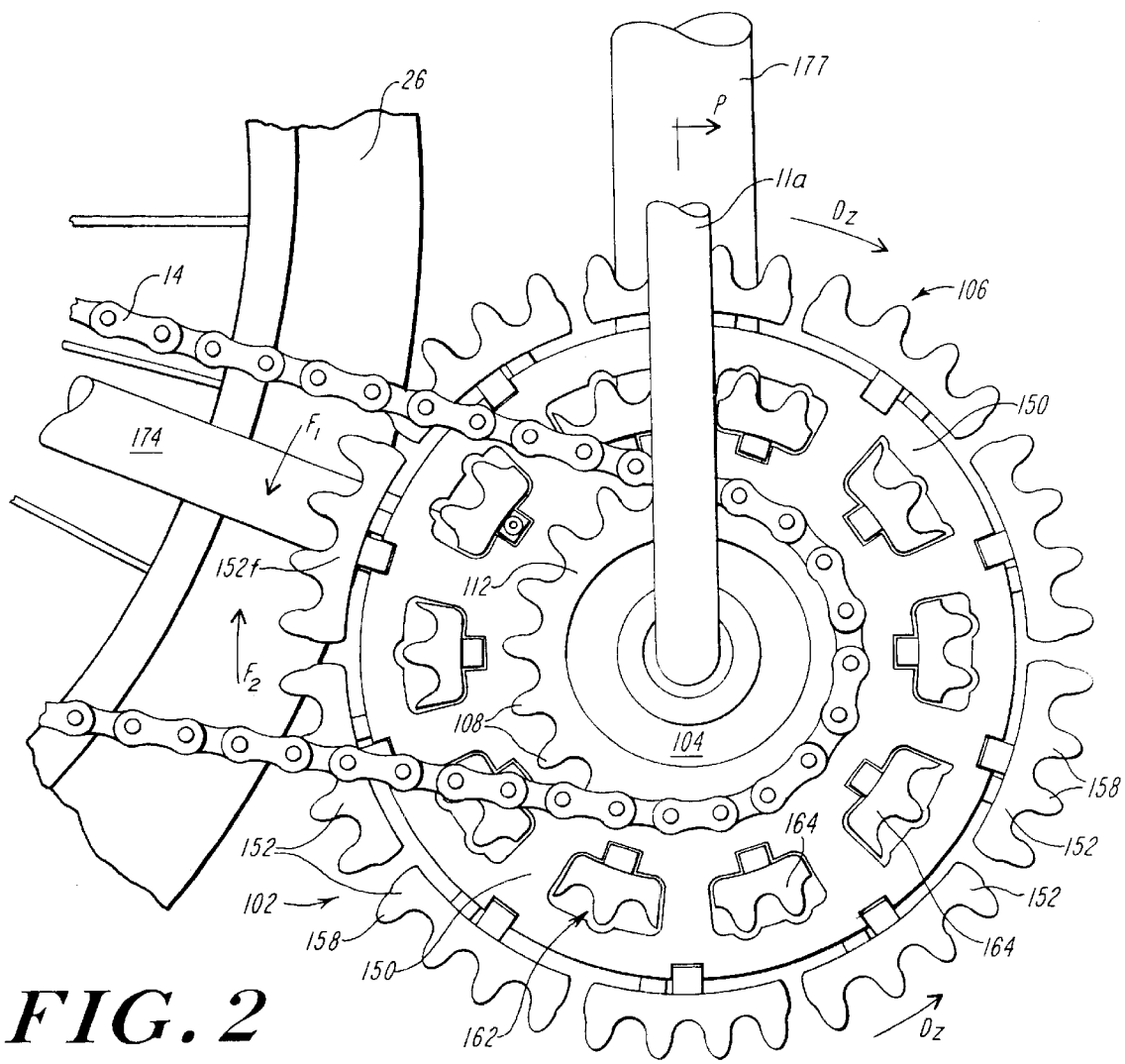
FIG. 2 is a schematic representation of a portion of an embodiment of the invention, showing a three ring front chain ring set, with movable gates, viewed from the direction of the smaller diameter chain ring face.
Figure 3:
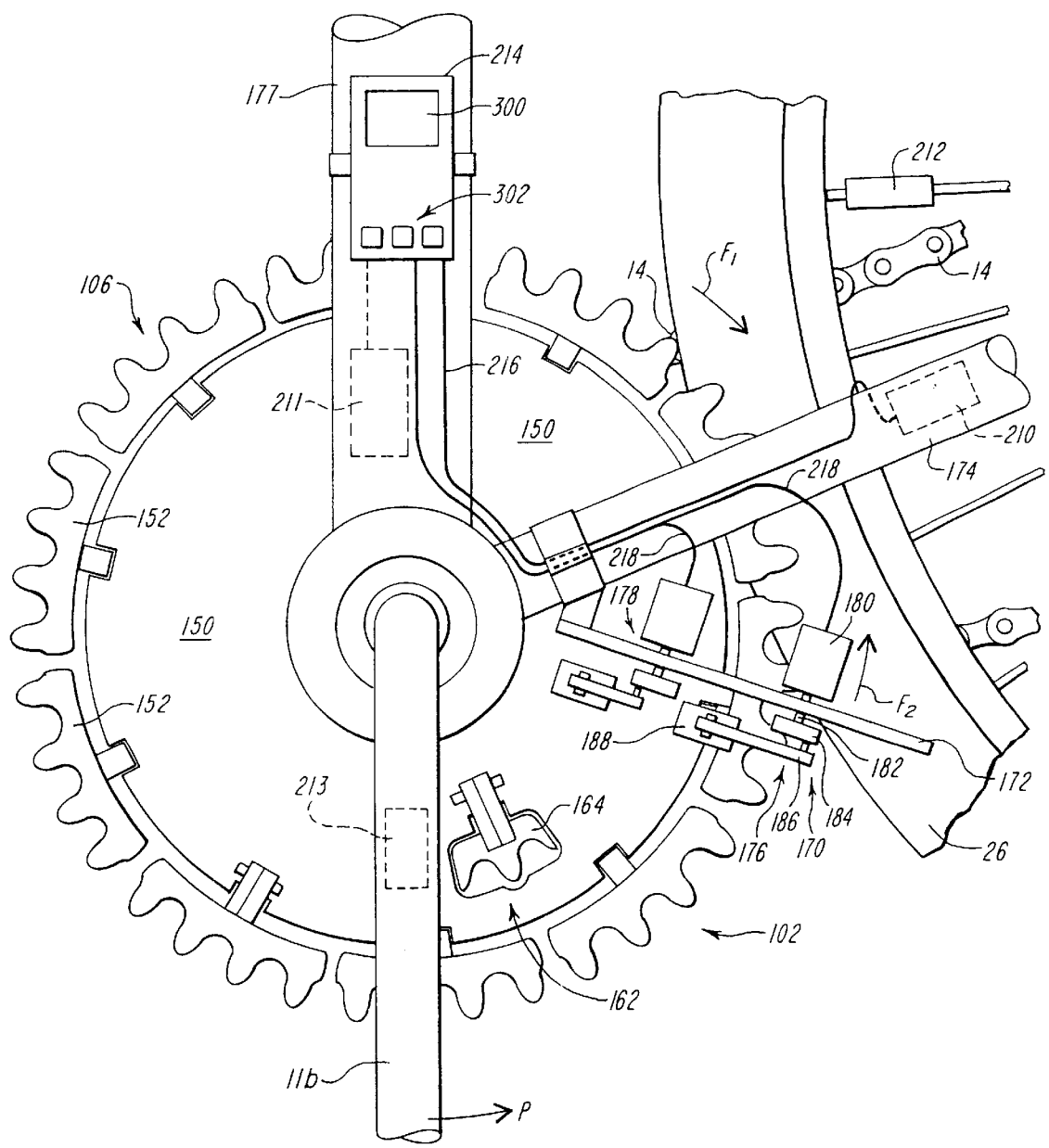
FIG. 3 is a schematic representation of a portion of the embodiment of the invention shown in FIG. 2, from the view of the opposite, larger diameter chain ring face, showing an embodiment of a gate actuator and gate placer/picker.

A preferred general embodiment of the invention is shown schematically with reference to FIGS. 2 and 3. FIG. 2 shows an embodiment of the invention adapted to be used at the front chain wheel of a bicycle, in place of a standard crank set. FIG. 2 shows the transmission component 102 as viewed from the chain side (in a conventional bicycle, the right side when driven forward). FIG. 3 shows schematically the transmission component 102 as viewed from the non-chain side (the left side when driven forward). (In the following discussion, conventional items are given the same reference numerals as shown in FIG. 1 with respect to a conventional bicycle and transmission. Also in the following, for simplicity, it is assumed that the driving band is a conventional bicycle chain. However, it can be other types of flexible driving bands, and they are not excluded from the invention by the use here of the term "chain." Further, for simplicity, it is assumed that the cycle is a bicycle. However, it could be any wheeled device that is driven by a band and wheel-type transmission, includes tricycles and four wheeled cycles. These variations are discussed in more detail after the basic discussion of the invention.)

A crank 11a, to which a pedal (not shown) is attached, is coupled through a bracket 104 to an innermost band ring 112. The band ring is innermost, as measured radially, with the origin being the axle around which the crank 11a and the band ring 112 rotate. The innermost band ring is mounted substantially conventionally with bearings, to turn with the crank 11a, as the pedals turn. The chain 14 is shown engaged by the innermost band ring 112. Band engaging elements 108, in the form of roughly triangular teeth, engage the chain between its links.

A support 150 is also coupled to the bracket 104 to rotate with the crank 11a. The support 150 supports an outermost, segmented, band ring 106, which is made up of a plurality of individual ring components or gates 152. In this case, ten gates 152 are shown. Each gate 152 carries a plurality of band engaging elements 158 like the innermost band ring, again in the form of roughly triangular teeth. The outermost gates 152 are movable, under control as discussed below, from a non-driving position (as shown in FIG. 2) to a driving position, shown as discussed below. Thus, the segmented band ring constitutes a variable configuration ring assembly.

Figures 4A, 4B, 4C, 4D, 4E:
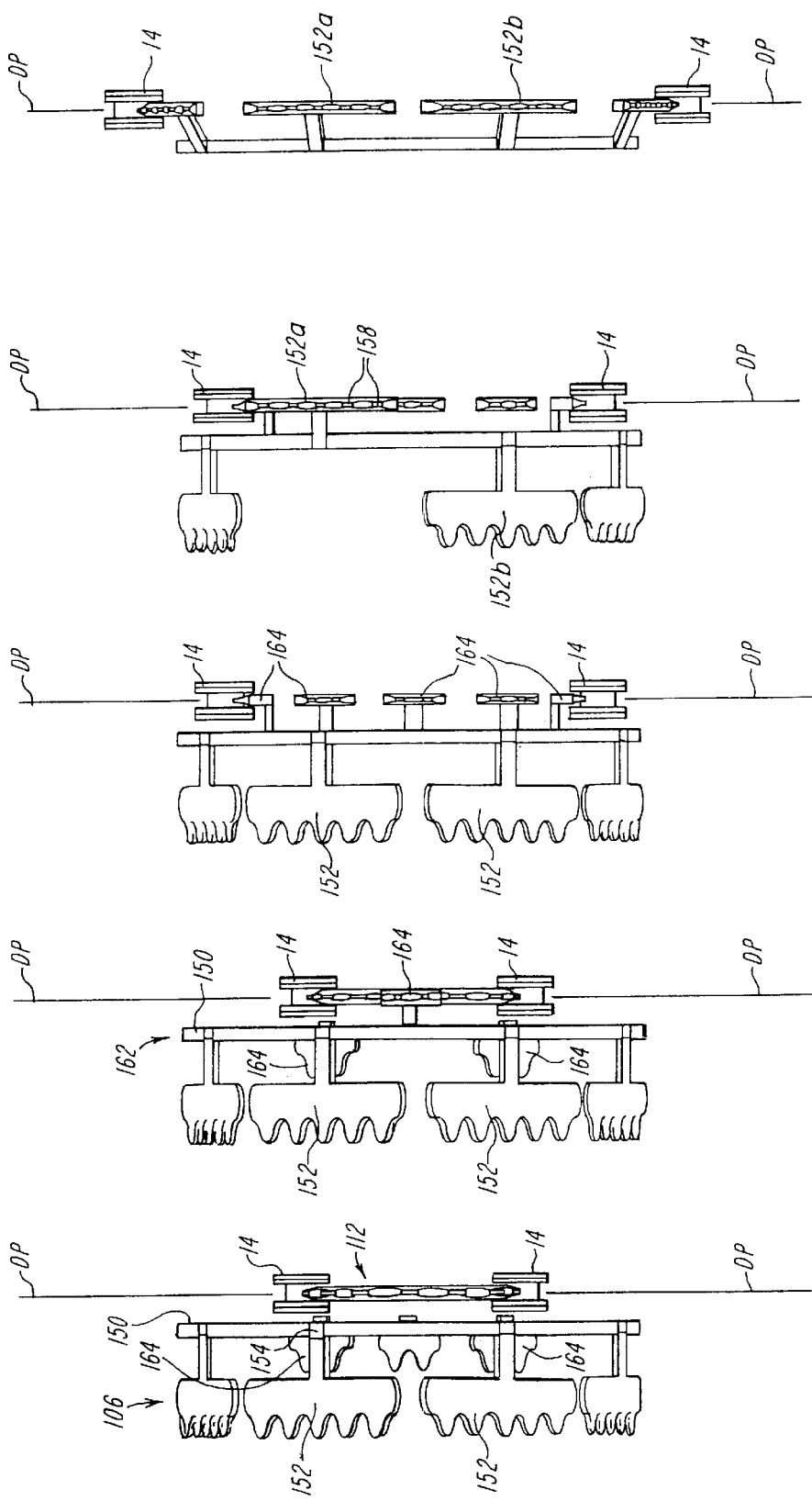
FIGS. 4A–4E are schematic representations of a portion of a chain ring set of an embodiment of the invention; where.

The driving position is better understood with reference to FIGS. 4A–4E, which show schematically an edge view of a portion of the innermost 112 and outermost 106 band rings, the support 150, as well as the chain 14 (and an intermediate band ring discussed) below). The view of FIG. 4A is from behind the chain ring, looking forward. Only two links of the chain, are shown, one each at the top and bottom of the chain ring, or, arriving and leaving it. As shown in FIG. 4A, the outermost gates 152 are in the non-driving position. They rest away from a driving plane, designated DP, in which the innermost chain ring 112 permanently resides. The gates 152 can flip around a hinge 154, generally from left to right, as shown in FIG. 4A, or out of the page, as shown in FIG. 2.

Moving Driving Band to Larger Diameter Band Ring

FIGS. 4B and 4C also show the outermost gates 152 in the non-driving, or out of plane position. FIG. 4D shows one of the outermost gates, 152a flipped to a driving position, so that the band engaging elements 158 lie in the driving plane DP. FIG. 4E shows both outermost gates 152a and 152b flipped to a driving position. Thus, when all of the individual outermost gates 152 are flipped to a driving position, and locked in place (as discussed below) together, they constitute a band ring capable of carrying the chain 14, but at a larger diameter than the innermost band ring 112. Thus, a change in gear ratio can be effected between that arising from the large diameter outermost band ring 106 and the small diameter innermost band ring 112.

A very important feature of the present invention is that the gates 152 are arranged so that they move from a non-driving position to a driving position when they are in a "free zone" as defined below, rather than in the driving zone, forward of and between the arrows $D_z$, as shown in FIGS. 1 and 2. The free zone is as shown between the arrows $F_1$ and $F_2$, generally to the rear of the band rings, in a circumferential location where the chain does not engage any of the band rings. Thus, when motion from the non-driving to driving position is made, the gate and respective band engaging elements, or teeth, are under no load, and not subject to any mechanical interference from the chain 14 (or, more generally, any sort of power band). In general, the circumferential size of the free zone for larger diameter band rings is larger than the free zone for smaller diameter band rings.

In operation, a gate in the free zone, such as the gate designated 152f, is moved from the non-driving position to the driving position while it is in the free zone, and this while it is not contacting the chain 14. The motion from the non-driving position to the driving position is under control of an actuator that is discussed below. The gate 152f then moves into the driving plane DB, in which plane the chain 14 also lies. As the gate 152f then moves, in a clockwise direction as shown in FIG. 2 (generally in the direction of arrow $F_2$) under power from the rotation of the cranks 11a and 11b, it encounters the chain 14, essentially coming up from below the chain, and lifts the chain 14 off from its engagement with the smaller, innermost chain ring 112. As each successive gate 152 enters the free zone, it is moved by the actuator (discussed below) into the driving position in the driving plane DP and then encounters the chain 14. Eventually, the chain is engaged entirely by gates 152 of the outermost chain ring 106, and no longer contacts the innermost chain ring 112 at all. Thus, the gear ratio is changed.

Two motions of the gate are described above: circumferential, from out of the free zone, into the free zone, and out of the free zone again; and perpendicular to the driving plane DP, from out of the driving position to into the driving position in the driving plane. These two motions are essentially independent, except to the extent that the motion into and out of the driving plane only occurs when the circumferential position of a gate 152 is in the free zone. These two types of motion are caused by two different sets of mechanical components.

In the embodiment shown in FIGS. 2 and 3 and 4A–4E, a radially intermediate variable position band ring 162 is also shown, with a plurality of intermediate gates 164, supported hingedly from the support 150. Ten intermediate gates 164 are also shown in FIG. 2.

The intermediate gates 164 function essentially the same as do the outermost gates 152. An actuator moves them from an out of driving position (shown in FIG. 4A for all three of the shown intermediate gates, and in FIG. 4B for two of them) to a driving position in the driving plane DP (sshown with one in the driving position in FIG. 4B, and all three in the driving position in FIG. 4C). Assuming that the chain is engaged by the innermost chain ring 112, if the intermediate gates 164 are moved into the driving position when they are in the free zone, they pick up the chain 14 as they move around the circumference, in the same manner as is described above for the outermost gates. Subsequently, the chain 14 may be removed from the intermediate band ring 162 by positioning of the outermost gates 152 in the driving positions, as discussed above.

Moving Driving Band to Smaller Diameter Band Ring

The forgoing has described, generally, moving the chain 14 from a smaller diameter band ring to a larger, by motion of the larger gates from out of the driving position to into the driving position. Reverse motion is also accomplished, moving the chain 14 from a larger diameter band ring to a smaller.

Consider if the chain 14 is carried by the radially outermost band ring 152. Thus, all of the outermost gates 154 are in the driving position in the driving plane DP, as are all of the intermediate gates 164. The innermost band ring 112 is also in the driving position, in the driving plane, as it is permanently in the driving plane DP.

When it is desired to move the chain 14 from the larger diameter, outermost chain ring 106, a first outermost gate 152, when and only when it is in the free zone, rearwardly between the arrows $F_1$ and $F_2$ as shown in FIGS. 2 and 3, is moved from the driving plane, to out of the driving plane DP. All of the following outermost gates 152 are also subsequently so moved. Thus, the chain 14 gets picked up by the gates 164 in the intermediate chain ring 162, which are all in the driving plane DP, at a radially smaller circumference.

Similarly, when it is desired to move the chain 14 from the relatively larger diameter, intermediate chain ring 162, to the smallest diameter, innermost chain ring 112, a first intermediate gate 164, when and only when it is in the free zone, is moved from the driving plane DP to out of the driving plane, as are all following intermediate gates 164. Thus, the chain 14 gets picked up by the chain engaging elements 108 of the innermost chain ring 112, which are all permanently in the driving plane DP, at a radially smaller circumference.

Actuating the Gates

The gates can be moved from a non-driving position to a driving position and vice-versa by various mechanisms. A preferred mechanism is shown with reference to FIGS. 3, 5A–5B and 6A–6C.

FIG. 3 shows the transmission component 102 from the rider's left side of the cycle, or the non-chain side as a rider would ride the cycle. Several of the outermost gates 152 are shown, and only one of the intermediate gates 164 are shown. However, it will be understood that in actuality, there are a plurality of intermediate gates 164 also.

An actuator set 170 is supported by an actuator support 172 that is clamped to the chain stay 174. The actuator support supports two actuator units: one 176, which actuates the outermost gates 152; and another 178 for the intermediate gates 164. The actuator units 176 and 178 are essentially identical, but for the lengths and shapes of some of the links. The actuator unit 176 for the outermost gates will be described as representative of both.

Each actuator unit includes an actuator 180, such as a simple DC motor. Other types of actuators are possible, and are described below. The motor axle 182 carries a cam 184 and the cam 184 carries a link 186. The link 186 is mounted eccentrically on the cam, relative to the axle 182. The link 186 is connected to a combination gate mover arm 188. When any particular gate passes by the circumferential position at which the gate mover arm is located, the gate may be actuated by the respective actuator unit, e.g. 176.

In the embodiment shown, the actuator 180 is driven to its extreme in one or the other rotary direction, where it stops. This drives the axle, cam, link and gate mover to a configuration, where the entire mechanism either causes placing the gate 152 into a driving position, or picking it from a driving position, as explained in more detail below, in connection with FIGS. 5A–D and 6A–C.

Figure 5D:
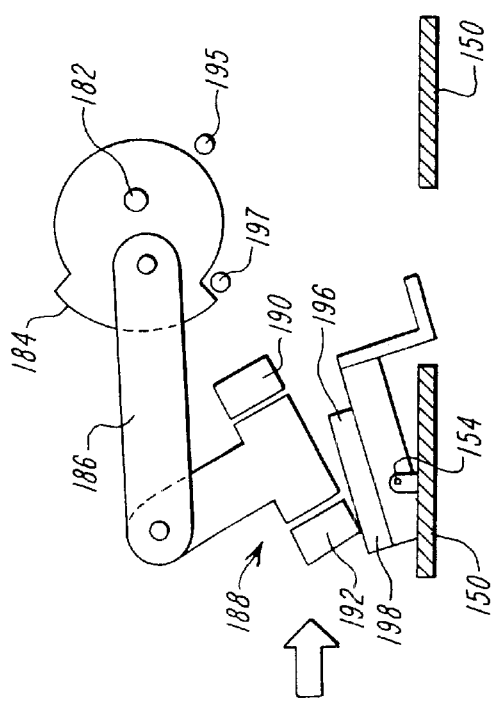
FIG. 5D shows schematically a gate and gate mover, as the gate mover contacts the gate just after the gate moves from a driving position to a non-driving position.

FIGS. 5A–D show a single cam 184, link 186, gate mover 188 and gate 152, from below (i.e., from the ground, if the cycle were in the driving position), as if the bottom of FIG. 3 were tipped toward from the observer. FIG. 5A shows a gate as it is about to be moved from a non-driving position to a driving position. FIG. 5B shows the gate just after it has moved to the driving position. In both FIGS. 5A and 5B, the cam, link and gate mover are in the placing configuration, with the placer trigger portion 190 of the gate mover contacting the gate 152, and with a cam surface of the cam 184 stopped against a placing stop 195. The axle 182 about which the cam rotates, and the picking cam stop 197 are shown in phantom in FIGS. 5A and 5B. The gate rotates around the axle 154, which is supported by the support 150.

Figure 5C:
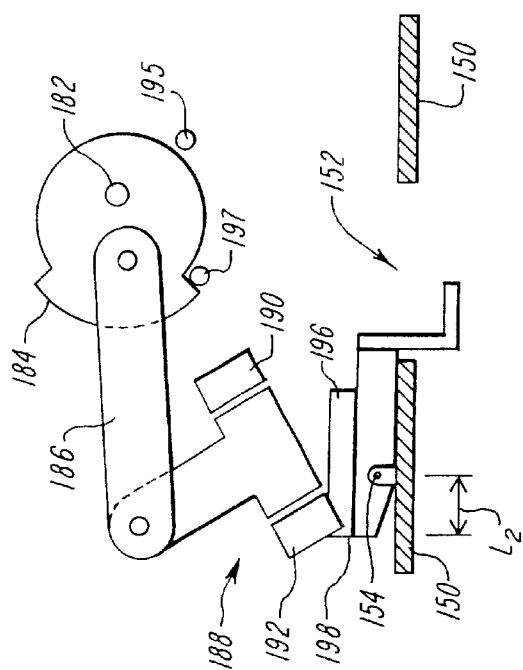
FIG. 5C shows schematically a gate and gate mover, as the gate mover contacts the gate just before the gate moves from a driving position to a non-driving position.

FIG. 5C shows a gate as it is about to be moved from a driving position to a non-driving position. FIG. 5D shows the gate just after it has moved to the non-driving position. In both FIGS. 5C and 5D, the cam 184, link 186 and gate mover 188 are in the picking configuration, with the picker trigger portion 192 of the gate mover 188 contacting the gate 152, and with a cam surface of the cam 184 stopped against a picking stop 197.

Gate Configuration

Figure 6A:
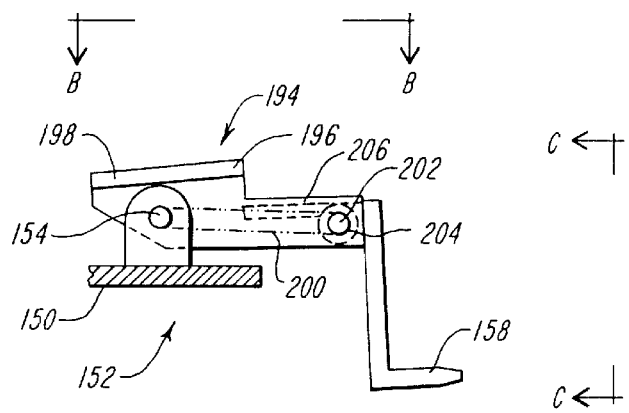
FIG. 6A shows a gate of an embodiment of the present invention, from a side view.
Figure 6B:
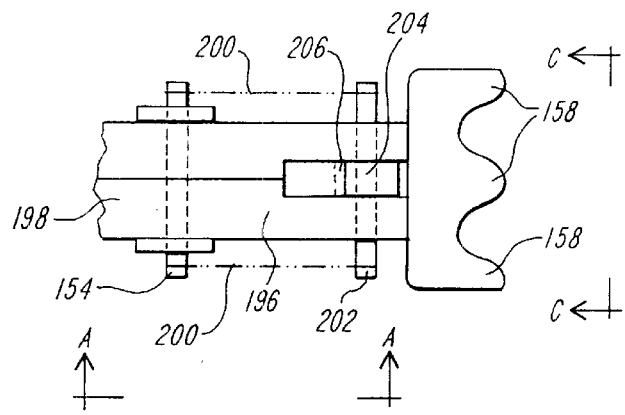
FIG. 6B shows a top view of a gate of an embodiment of the present invention, shown in FIG. 6A.
Figure 6C:
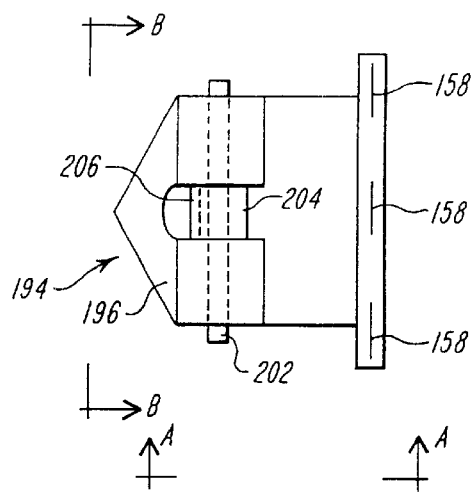
FIG. 6C shows an end view of a gate of an embodiment of the present invention, shown in FIG. 6A.

A typical configuration for a gate 152 is shown with reference to FIGS. 6A–6C. FIG. 6A shows a gate 152 from the side, as depicted in FIGS. 5A–5D. FIG. 6B shows a gate from the top, or, from the non-chain side, for instance as seen in FIG. 3. FIG. 6C shows the gate from an end view, looking down directly onto chain engaging elements, or teeth 158. FIG. 6C might be thought of as a view from the chain itself. Each gate 152 is composed of band engaging elements 158, which rotate around the hinge 154, which is mounted in the support 150. Typically, a plurality, such as three band engaging elements are provided per gate. However, as few as one is possible.

The gate has an angled surface 194, which has a placer region 196 at one end and a picker region 198 at the other. The surface 194 is shown to be pyramidal, but it need not be. It can be a simple slant, or curved. It is basically a ramp cam surface, which is pushed away by the gate mover as the ramp passes by the gate mover in the ramp's circuit around with the pedals. However, it is beneficial for it to be slanted on both faces, as shown in FIG. 6C, because then, if the operator rotates the pedals backwards, which is common with certain types of transmissions, then the transmission will not jam, but will simply be passed over in the same manner as if the pedals were moving in a forward direction.

As shown in FIG. 5A, when the gate mover 188 is in the placing configuration, the placer trigger portion 190 of the gate mover 188 is located so that it contacts the placer region 196 of the gate on one side of the hinge 154. As the gate rotates around the circuit with the pedals, out of the page as shown in FIG. 5A, the gate encounters the stationary gate mover. The gate mover pushes against the slanted surface of the gate, which then flips away to its other position. The gate tilts from a non-driving position to a driving position (as shown in FIG. 5B). The gate is spring loaded, as discussed below, so that it moves slightly beyond the position where it contacts the gate mover 188 after it has moved into the driving position, so that on subsequent passes the gate mover 188 does not rub against the gate. It is important that there be enough of a lever arm $L_1$ between the hinge and the placer end 196 of the gate, so that the gate will move into the driving position when the placer trigger encounters the gate. It has been found that as little as 0.375 in. (0.95 cm.) is sufficient.

As shown in FIG. 5C, when the gate mover 188 is in the picking configuration, the picker trigger 192 of the gate mover 188 is located so that it contacts the picker region 198 of the gate on the other side of the hinge 154, so that the gate tilts from a driving position (as shown in FIG. 5C) to a non-driving position, as shown in FIG. 5D. Again because the gate 152 is spring loaded, it moves slightly beyond the position where it contacts the gate mover 188 after it has moved into the non-driving position, so that on subsequent passes the gate mover 188 does not rub against the gate. It is also important that there be enough of a lever arm $L_2$ between the hinge and the picker end 198 of the gate, so that the gate will move out of the driving position when the picker trigger encounters the gate.

The spring loading may be of various configurations. A preferred embodiment has a pair of biasing springs 200, which force between the axle of the hinge 154 and a floating pin 202, which carries a cam 204. The cam 204 is pressed against a reference edge 206. As the gate moves from, for instance, the non-driving position to the driving position, the cam 204 encounters the reference edge and rolls around it, thereby stretching the biasing springs 200. As soon as the cam passes the extreme of the edge, it is pulled by the biasing spring back toward the hinge 154, and gently locks the gate in the driving position. Thus, the springs 200, reference edge 206 and cam 204 act as a detent. Other schemes for gate motion are possible. Various types of springs (leaf, coil, etc.) and detents (cams, spring-loaded balls, etc.) may be used. These components serve to quickly move the gate into the target position once it has been actuated, and to retain it there until actuated to the opposite configuration. Such an alternative embodiment for a gate is shown with reference to FIGS. 12A and 12B, and 13A and 13B, discussed below.

It is also important to minimize friction between the angled surface 194 and the picking and placing triggers of the gate mover 188. Abrasion resistant, low friction materials can be used. Alternatively, each of the picking and placing triggers 192, 190, can be free, rotating disks mounted to spin freely on an axle S, such as shown in FIG. 5A.

Actuator Control

In the embodiment discussed above, the actuators 180 are DC motors. For instance 1.5 volt, DC motors with copper wipers are suitable. A suitable control system works by providing current to drive the motor in a first direction, until the actuator cam 184 hits a first stop, for instance the placing stop 195. The motor is sized such that it simply stops when the cam hits the stop, and does not overheat, even though power is still applied to it. Similarly, when it is driven to the opposite extreme and the actuator cam 184 stops against the picking stop 197, the motor again simply stops.

A suitable control apparatus is shown with reference to FIG. 3. A speed sensor 210 is mounted on the chain stay 174, facing the rear wheel. A rotation marker 212 is mounted on the cycle wheel 26, for instance on a spoke, facing the speed sensor 210. Each rotation of the wheel causes an electric signal to be generated at the sensor 210. A typical such speed sensor uses a Hall effect magnetic sensor, but many other types are known. This speed signal is transmitted to a power and control module 214, for instance by wires 216. Alternatively, the connection can be wireless, in the same manner as are now many bicycle speed monitors. The control module 214 is also connected, for instance by wires 218 to the actuators 180, to supply power thereto at controlled times and durations and directions, i.e. positive or negative current.

In a typical arrangement, the actuator 180 that actuates the outermost gates 152, on the largest diameter band ring 106, is controlled to place the gates into the driving position only after the rotational speed of the bicycle wheel 26 exceeds an "outermost band ring up-shift speed." If such a speed has been reached, then the wheel 26 is turning so fast that the operator could benefit from an upshift to the outermost band ring, and the system delivers an upshift. The gates remain in the driving position, until the speed of the wheel 26 drops below another speed, designated the "outermost band ring down-shift speed." At that point, it has become difficult for the operator to maintain the desired pedal rotation rate with the higher transmission ratio effected by running the chain on the largest band ring. The system shifts to a lower gear ratio, by signaling the actuator 180 to rotate the opposite direction, thereby picking the gates from the driving to the non-driving position, thereby allowing the chain to drop down from the outermost band ring to a smaller diameter band ring, as discussed above. For instance, if there is only one variable conformation band ring, and one permanent fixed band ring, then the chain drops down to the fixed, innermost band ring 112. If there is an intermediate band ring, such as 162 shown in FIG. 2, then the chain drops down to that intermediate band ring.

The power and control unit 214 includes a data processor and signal generator such as the microprocessors that are typical in cycle computers that act as speedometers, odometers, cadence monitors, etc. The data processor is capable of comparing the present speed of the cycle, based on the rotational speed of the wheel, and other factors with user or factory set up-shift and down-shift velocities. Based on the comparison, the appropriate actuator is actuated in the appropriate direction. It typically features a display 300 and input elements 302, such as buttons.

Typically, there is hysteresis in the system, to avoid chattering. In other words, for any given band ring, the up-shift velocity for shifting up to the band ring from a smaller band ring is slightly, but noticeably, greater than the corresponding down-shift velocity for shifting down from it. Otherwise, for instance if the two velocities were equal, if the wheel achieved the up-shift velocity and then immediately dropped below the up-shift velocity just after it had been achieved, the system would try to down-shift almost immediately after up-shifting, resulting in chattering back and forth between up and down shifting. The same would be true upon down-shifting. In general, a difference that corresponds to one mile an hour has been found to be suitable, although different users may find that more or less hysteresis is more suitable for them. Thus, these velocities can be user programmed according to known means, using the display 300 and buttons 302 to control the controller. Further, the measure of hysteresis can be based on the speed of the cycle, or the cadence of the pedals, or a combination of both. If the hysteresis is based in any part on the pedal cadence, then the processor must take into account the fact that upon shifting, an abrupt change in pedal cadence arises.

For convention, as used herein, the up and down-shift velocities are designated based on the actuator involved. For instance, the outermost up-shift velocity is for shifting from an intermediate to an outermost band ring. The outermost down-shift velocity is for shifting from the outermost band ring to a smaller band ring. If there is an intermediate band ring, the intermediate up-shift velocity is for shifting from a smaller, inner band ring, up to the larger intermediate ring. The intermediate down-shift velocity is for shifting from the intermediate band ring down to a smaller, inner band ring.

Goals Achieved

Thus, the described invention accomplishes the goals set out. It provides an automatic shifting transmission, which the user need not worry about. The shifting occurs at appropriate times. Most importantly, the mechanical components move in the free zone when they are not under mechanical load, and thus stripping and missing of gears is totally eliminated. This free zone shifting occurs for both up-shifting and down-shifting. The device can be easily retrofitted on virtually all existing conventional bicycles. All that must be done is the conventional chain ring and perhaps pedal assembly must be switched for the band ring assembly discussed. The actuator support plate and associated actuators must be provided, along with a wheel speed sensor and a power and control unit.

Variations

Many variations on the above described invention can be had without departing from the spirit of the invention.

Gate Designs

Figure 12A:
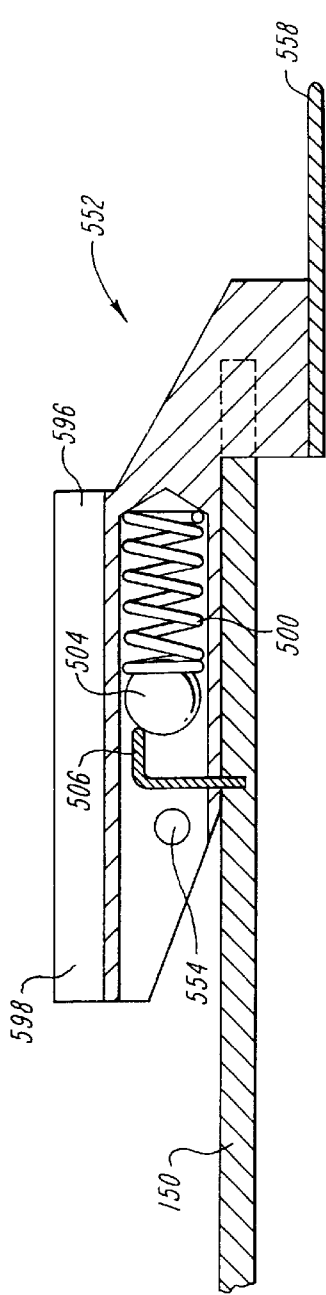
FIG. 12A shows a view of a gate of another embodiment of the present invention, from a side view, shown in the driving position.
Figure 12B:
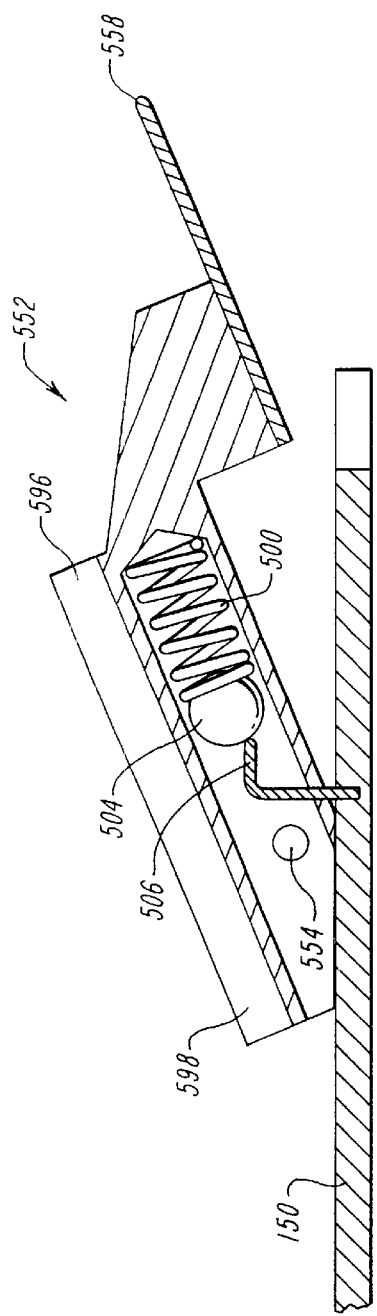
FIG. 12B shows a view of a gate of the embodiment of the present invention shown in FIG. 12A, from a side view, shown in the non-driving position.

An alternative preferred embodiment of a gate is shown with reference to FIGS. 12A and 12B. FIG. 12A shows another embodiment of a gate of the invention, oriented in the driving position. FIG. 12B shows this embodiment oriented in the non-driving position. The gate 552 is hinged through a hinge 554 to the support 150, as discussed above. The primary difference is the spring and detent mechanism. The body of the gate 552 is partially hollow, in which recess resides a coil spring 500, which is loaded against a stop by a ball 504. The ball moves around an edge of a guide 506, which acts as a sort of cam follower. In this embodiment, the guide 506 plays the role of the edge 206 of the embodiment shown in FIG. 6B. The ball 504 functions as does the roller cam 204, and the coil spring 500 functions analogously to the springs 200 shown in FIG. 6A.

If the gate is in the driving position, as shown in FIG. 12A, and the gate moves along with the support 150, so that it encounters a gate mover, with the gate mover positioned to press upon the picker end 598 of the gate, it will push the gate such that it rotates counter clockwise around the hinge 554 (as shown in FIG. 12A). The ball 504 will be forced, by the guide 506 against the spring, compressing the spring 500, so that there is clearance for the ball 504 to move around the edge of the guide 506, and then roll back away from the spring 500, so that the guide 506 again prevents the ball from moving. With the ball gently locked in place, the gate 552 will stay in the non-driving position.

In contrast, if the gate is in the non-driving position, as shown in FIG. 12B, and the gate moves along with the support 150, so that it encounters a gate mover, with the gate mover positioned to press upon the placer end 596 of the gate, it will push the gate such that it rotates clockwise around the hinge 554 (as shown in FIG. 12B). The ball 504 will be forced, by the guide 506 against the spring, compressing the spring 500, so that there is clearance for the ball 504 to move around the edge of the guide 506, and then move back away from the spring 500, so that the guide 506 again prevents the ball from moving. With the ball gently locked in place, the gate 552 will stay in the driving position.

A potential drawback of this embodiment is that in many cases, the ball moves around the guide with significant friction therebetween, thereby causing wear, and increasing the required actuation force. The embodiment shown in FIG. 6A, in contrast, has much less friction, because the roller 204 spins on the axle 202 and rolls around the edge 206.

Figure 13A:
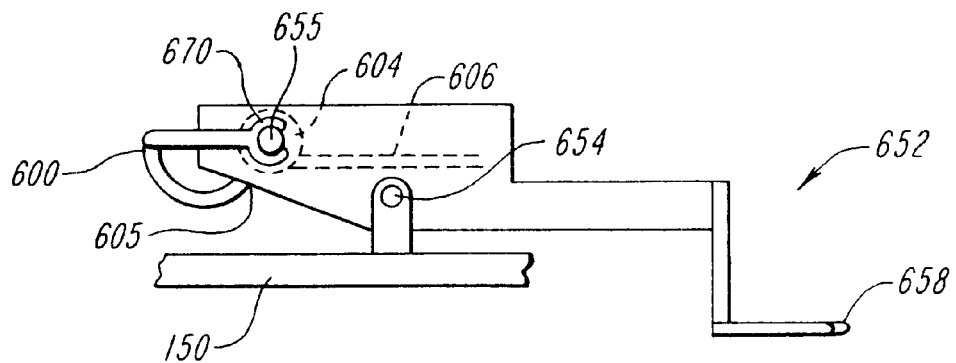
FIG. 13A shows a gate of another embodiment of the present invention, from a side view, with a different embodiment of a detent.
Figure 13B:
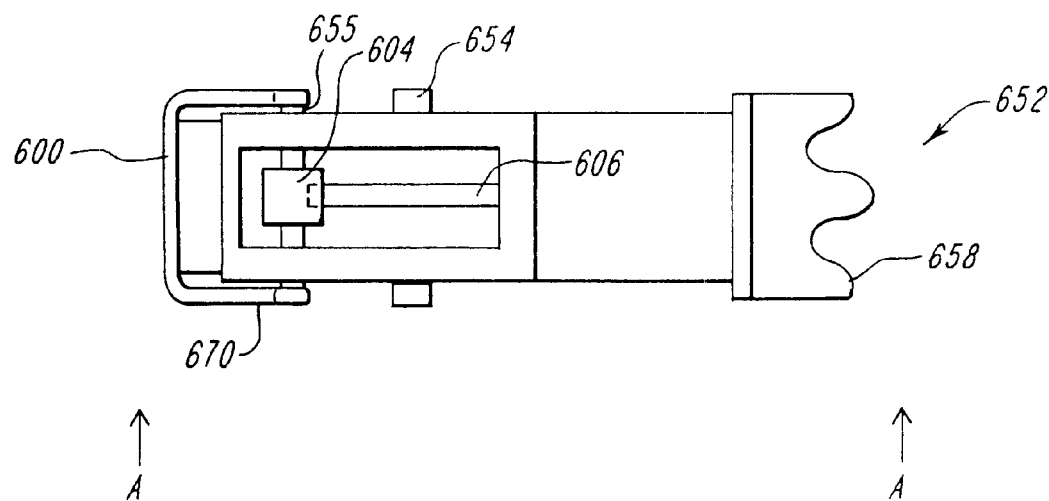
FIG. 13B shows a top view of a gate of an embodiment of the present invention, shown in FIG. 13A.

Another embodiment of a detent of the invention is shown with reference to FIGS. 13A and 13B, which are analogous to FIGS. 6A and 6B. In this embodiment, the spring action is provided by a leaf spring 600, which is at the end of the gate 652 distant from the engaging elements 658. The leaf spring 600 is anchored to the body of the gate at a base end 605 or by some other suitable means. A yoke portion 670 of the leaf spring 600 engages an axle 655, which, as in the embodiment shown in FIG. 6A, carries upon it a roller 604. The roller 604 is forced away from the leaf spring 670 by the spring action, into the edge 606. As with the embodiment shown in FIG. 6A, as the gate 652 is tipped around its axle 654, the edge 606 forces the roller 604 back against the spring 600 force, resulting in the roller 604 rolling around the edge 606, and then popping into place on the other face of the edge 606, under action of the spring reaction force. Thus, it is similar to that shown in FIG. 6A, except that rather than the spring 200 pulling the roller 204 toward the edge 206, the leaf spring 600 pushes the roller 604 toward the edge 606. Thus, the location of the spring, roller and edge are partially reversed.

Figure 15A:
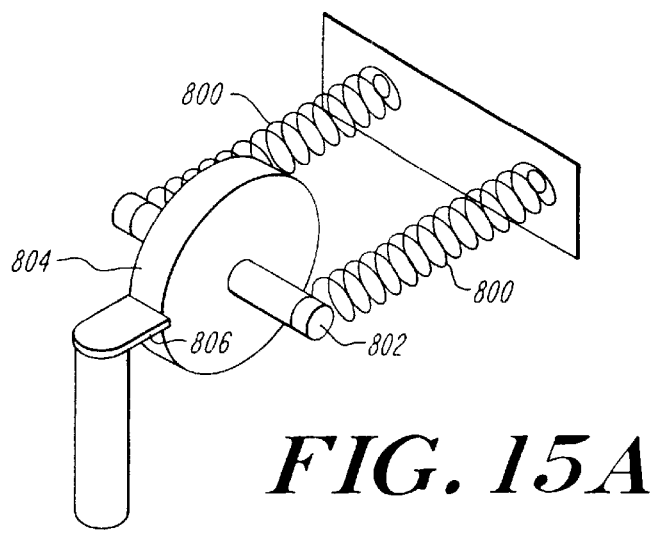
FIG. 15A shows schematically a detent portion of a gate of another embodiment of the present invention, from a perspective view, which detent is a roller that rolls around a knife edge.
Figure 15B:
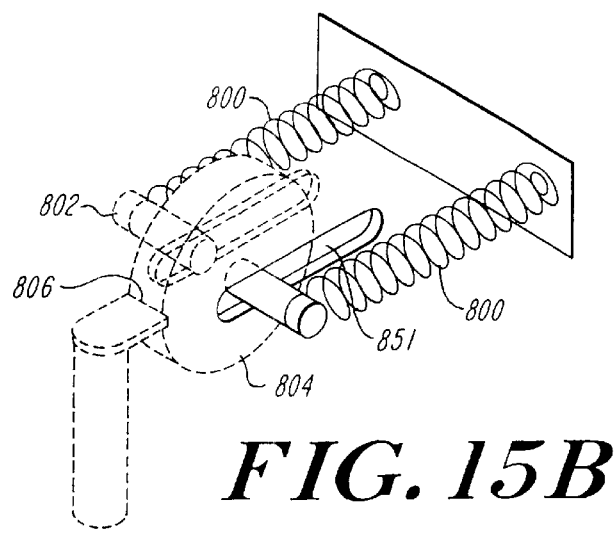
FIG. 15B shows schematically the detent portion shown in FIG. 15A, showing its relation to the external body of the gate.
Figure 15C:
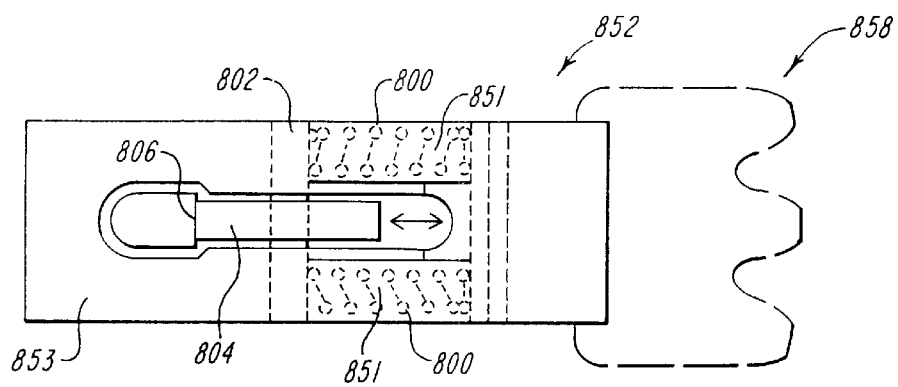
FIG. 15C shows schematically, a top plan view of a gate, such as is shown in FIG. 15B.

Still another embodiment of a detent mechanism is shown with reference to FIGS. 15A–15C. This embodiment uses a roller and knife edge, such as is used in the embodiment shown in FIGS. 6A–6C and internal springs 800 that are compressed, such as is shown in FIGS. 12A and 12B. The springs 800 push against an axle 802 that carries a wheel 804, which rolls around a reference edge 806, as discussed above. The springs 800 are retained within the body 853 of a gate 852, in channels 851. Thus, the springs 800 are protected against the elements. Furthermore, the wheel 804 rolls around the reference edge 806 without much, if any friction. As shown in phantom in FIG. 15C, the band engaging elements 858 may be on the spring side of the detent mechanism. Alternatively, the band engaging elements can extend in the opposite direction (not shown), from the opposite end of the gate, near the reference edge. In either case, the hinge around which the gate tips must be properly located, as shown in FIG. 5A, or 12A. Another alternative is to arrange such a detent mechanism with the springs in tension, rather than in compression. Many such variations are evident to the person skilled in the art.

Worm and Gear Actuation Mechanism

Figure 7:
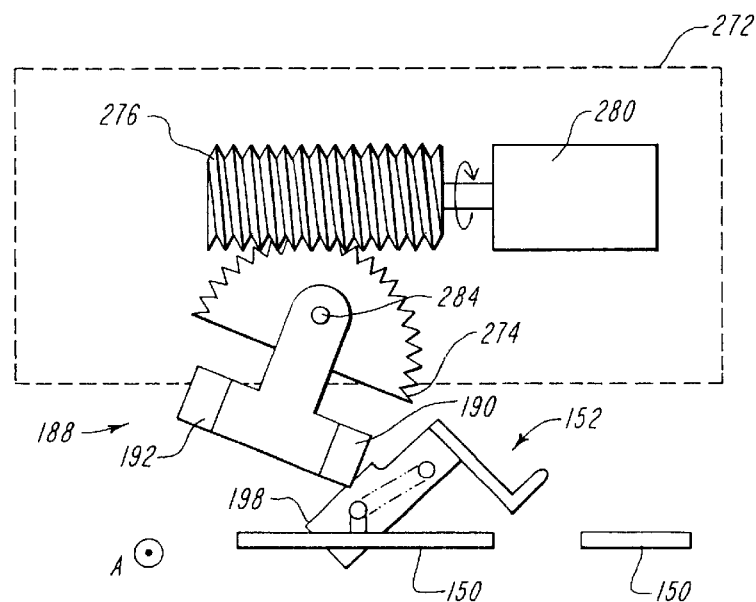
FIG. 7 shows schematically, from below the cycle, a gate and gate mover, similar to that shown in FIG. 5A, except that a worm gear and worm transmission is used, rather than links, as the gate mover contacts the gate just before the gate moves from a non-driving position to a driving position.

As another variation, a different actuation mechanism can be used. An alternate is shown with reference to FIGS. 7 and 8, which correspond roughly to FIGS. 5A and 5C. FIG. 7 shows a worm and worm gear actuator assembly, from below, in the same manner as FIG. 5A shows the assembly also shown in FIG. 3.

The gate 152, placing trigger 190 and picking trigger 192 of the gate mover 188 and gate support 150 are all identical to that discussed above. The actuator assembly support plate 272 is shown in phantom in FIG. 7, and is placed correspondingly to the support 172 shown in FIG. 3. The elements mentioned immediately above are positioned below the support plate 272 when the cycle is in the driving orientation. The following elements are located on the other side, above the support plate 272. A worm gear 274 is rotatable about an axle 284, and is rigidly coupled to the gate mover 188 such that they both rotate around the axle 284 together. The worm gear 274 engages and is driven by a worm 276 that is in turn driven by a motor 280.

Figure 8:
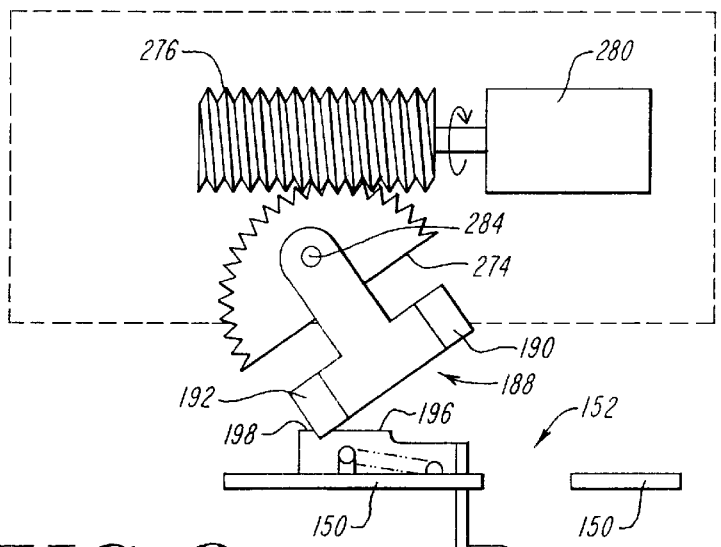
FIG. 8 shows schematically the worm embodiment of a gate and gate mover, shown in FIG. 7, in a configuration similar to that shown in FIG. 5C, as the gate mover contacts the gate just before the gate moves from a driving position to a non-driving position.
Figure 9:
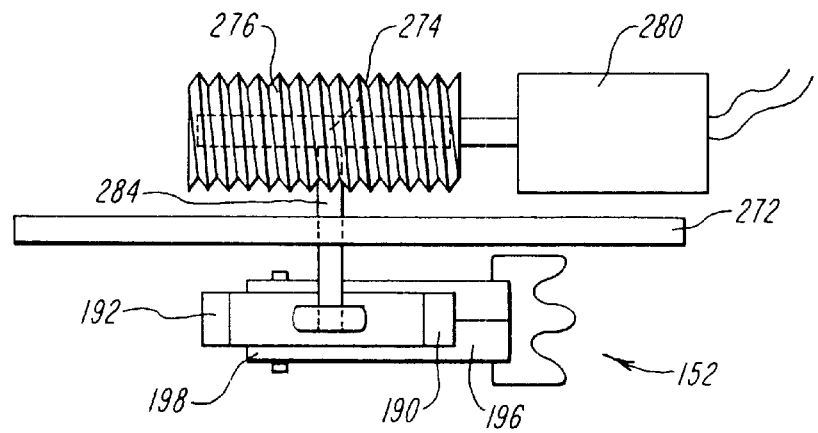
FIG. 9 shows schematically the worm embodiment of gate and gate mover shown in FIGS. 7 and 8, from a side view, as viewed from the non-chain side, such as in FIG. 3.
Figure 10:
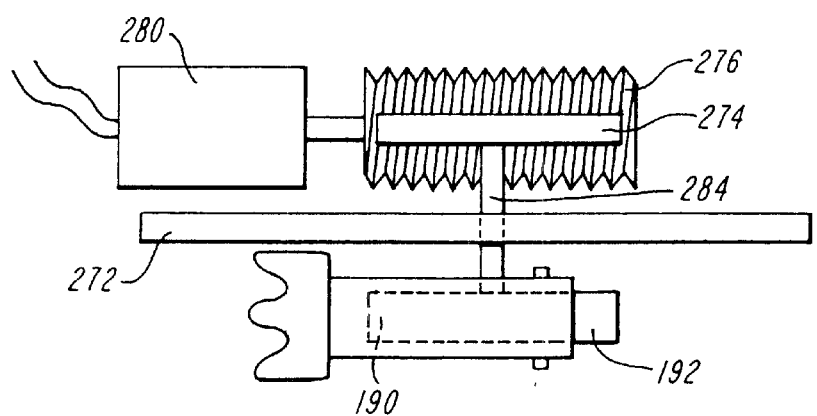
FIG. 10 shows schematically the worm embodiment of gate and gate mover shown in FIGS. 7 and 8, from a side view, as viewed from the chain side, such as in FIG. 2, but with many parts removed, including the band rings and other gates.
Figure 11:
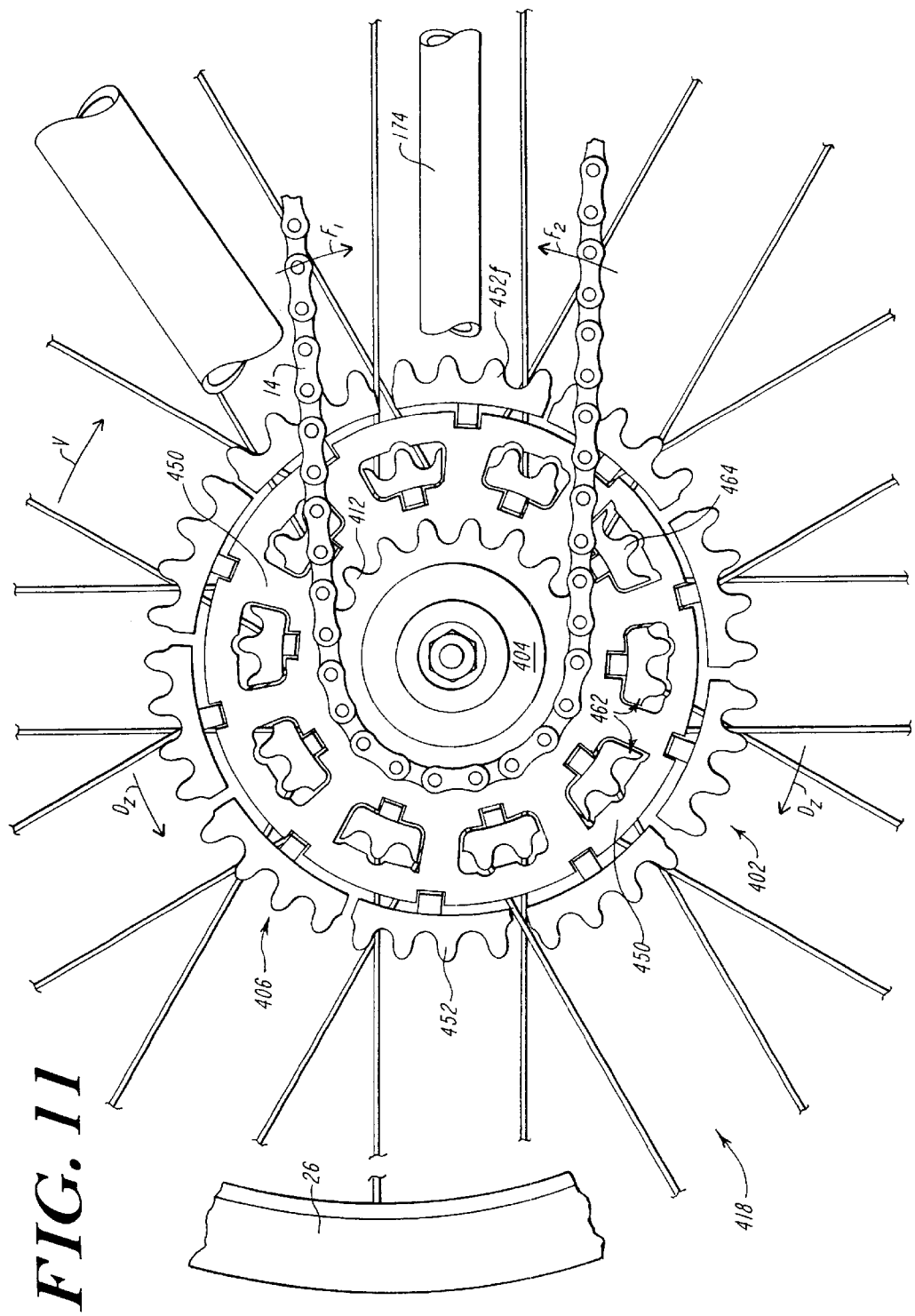
FIG. 11 shows schematically a transmission component of the invention for use mounted upon a rear wheel of a cycle.

Thus, rotation of the motor in one direction causes rotation of the worm 276 and its worm gear 274, and the worm gear axle 284, thereby swinging the gate mover 188 around the worm gear axle, so that it engages the gate 152 at the picker 198 and placer 196 surfaces as desired. FIG. 7 shows the configuration where the gate 152 is about to be placed into the driving position and FIG. 8 shows the configuration where the gate is about to be picked from the driving position. Using a worm and worm gear may provide for a more compact, robust mechanism.

For instance, a suitable arrangement includes a worm with ⅜ in. (0.95 cm) diameter and a worm gear with a 0.75 in. (1.9 cm) diameter.

In some cases, the worm embodiment may suffer from jamming, and care must be taken to avoid this. For instance, the motor may drive the worm with such momentum toward one extreme, that when time comes to reverse the motion, the motor is locked due to a jamming of the mechanism. Such jamming may arise due to flexibility of the shafts upon which the various elements turn, as well as play in the gears themselves. One way to minimize the risk of jamming is to monitor the location of the motor shaft, such as with an angular encoder, and to send this location to the controller. The controller can then be programmed to stop the worm just short of full travel into the mechanical stop. Or, alternatively, the mechanical stop can be eliminated altogether.

Another variation may have the motor of one actuator unit above the support plate 172, and the motor of the other below, with the associated respective links on the opposite face of the plate from their motor. This arrangement may also be more compact, depending on the size and shape of the cycle frame to which it is attached.

Servo Motors

Rather than using a simple DC motor, it is also possible to use servo motors, such as the type that are used in flying model airplanes. A potential drawback with some such servo motors is their weight, and also the fact that they continually draw power when actuated, even when not moving. Thus, upon placing or picking the gate, if left in the placing or picking configuration, the servo motor will draw power, thereby draining the battery. In general, servo motors sold by Futaba Corporation of Azabu Jyuban Minato-ku Japan, under model number S3101 have been found to be suitable. Other schemes may have linkages that allow a motor to be rotated in only one direction, rather than needing to reverse directions.

Different Motions for Gate

Figure 14C:
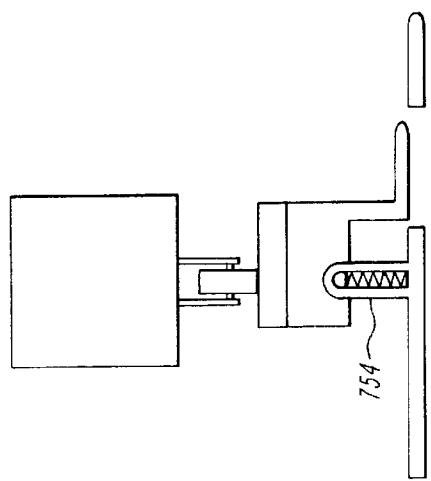
FIG. 14C shows schematically a gate of the embodiment shown in FIG. 14B, in the non-driving position.
Figure 14B:
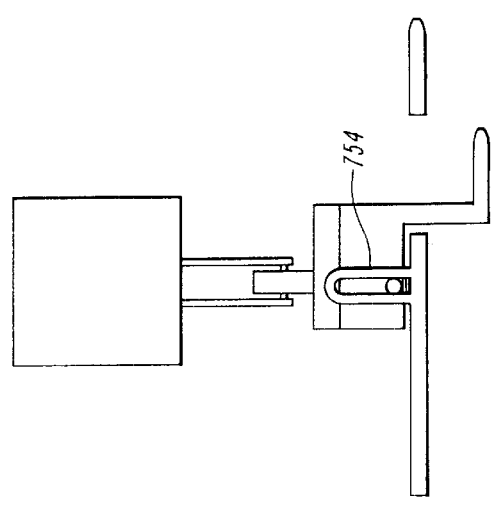
FIG. 14B shows schematically a gate of the embodiment shown in FIG. 14A, after it has contacted the gate mover and is being pushed against a spring to release it from the driving position.
Figure 14A:
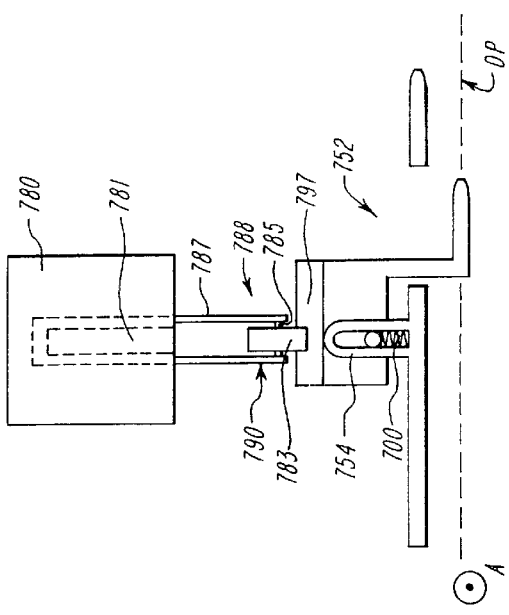
FIG. 14A shows schematically a gate of another embodiment of the present invention, from a side view, which gate translates against a spring under action of a solenoid, rather than rotating around a hinge, with the gate in the driving position.

The gates discussed above are arranged to rotate, around a hinge, into and out of the driving position. Motion is effected by the placer trigger 190, pressing on the placer 196, or the picker trigger 192 pressing on the picker 198. However, as shown in FIGS. 14A–14C, it is also possible for a different arrangement, where a gate mover 788 contacts a gate 752 at the same spot for both picking and placing. For instance, rather than rotating into place, the gate 752 can translate perpendicularly to the driving plane DP, against a spring 700 with a catch (not shown) that holds the gate 752 in the driving position (conceptually similar to the type of mechanism in a simple push-button, retractable ball point pen, but robust enough to withstand the forces of chain motion). As shown in FIG. 14B, a subsequent push of the gate 752 into the spring 700 releases the catch, and the gate 750 translates back out of the driving plane, perpendicularly to the driving plane, to the position shown in FIG. 14C.

In such a case, rather than having a separate placer trigger and picker trigger, the gate mover 788 may have or constitute a single combined trigger 790, which merely presses against the gate in the same spot, rather than in a picking location and a placing location. Such an embodiment can be effectuated with a servo mechanism or a solenoid type actuator 780, the core 781 of which moves linearly. This embodiment has fewer moving parts, which is an advantage. One potential drawback of such an embodiment is that the throw of the actuator may need to be greater than in the rotating case. However, the maximum throw of the gate is typically less, because the gate motion is purely perpendicular to (i.e., directly toward) the driving plane, whereas in the rotational case, the gate motion has a perpendicular component and a parallel component.

For instance FIG. 14A shows a linearly translating embodiment of the invention with the gate 72 in the driving position, about to be removed from the driving position. A roller 783 is free to spin on an axle 785 and moves with a frame 787 that is coupled to the solenoid core 781. The core and the frame and roller translate in a straight line normal to the driving plane. To remove the gate from the driving position, the solenoid 780 is energized to advance slightly, to the position shown in FIG. 14A, so that when the band ring rotates past it, the roller 783 encounters the angled ramp 797 of the gate, forcing the gate slightly toward the driving plane, against the spring 700, to the position shown in FIG. 14B. This releases a detent catch. The catch releases, and the gate 752 moves away from the driving plane, along guide channel 754, pushing the wheel 785 and solenoid elements back to a withdrawn configuration as shown in FIG. 14C. When it is desired to place the gate 754, the solenoid is energized and moved toward the driving plane to a placing position. When in this placing position, the gate mover wheel pushes the gate down against the spring 700, into the catch, where it stays, thus, engaging the driving band.

It is also possible for the motion of the movable transmission component to be within a driving plane, rather than perpendicular to it. For instance, there are known automatic transmissions for bicycles that have movable components that move radially, simultaneously with each other, thereby changing the effective radius of the chain wheel, either front or rear. See, for instance, U.S. Pat. No. 4,878,883 Wheless, U.S. Pat. No. 4,642,070 to Walker, U.S. Pat. No. 5,407,395, to Kramer, U.S. Pat. No. 5,582,555 to Miller, U.S. Pat. No. 5,772,546, to Warszewski and U.S. Pat. No. 4,454,766 to Mills, which are all incorporated herein fully by reference. In all, while there are in some cases components that do move to a driving configuration while they are in the free zone, there are always, at the same time, components that are in the driving zone that are also moving to the driving configuration. Thus, those components are engaging the driving band while also being urged to change to a different driving configuration. This entails complications of grinding, alignment, missing. They also require relatively large forces to be applied to moving the components, because they are simultaneously moving the driving band to another configuration, for instance a larger diameter around the chain wheel, while moving the transmission component.

It is possible to apply one general principal of the invention, to most of these prior art concepts, by configuring the actuation of the movable components so that they move only in the free zone, and not in the driving zone. Typically this would also entail decoupling the plurality of movable components from each other so that they do not move to the driving configuration simultaneously, as is common. Thus, the shifting actuator would act only on the movable component that is in the free zone.

Rear Wheel

The invention can also be applied to a rear wheel sprocket cassette 418. The basic operation of a rear wheel implementation of the transmission component 402 is the same as a front chain wheel implementation. The sprocket 418 is composed of a plurality of gear wheels, of which the innermost 412 is a fixed conformation with no moving gates. The chain 14 is shown engaged by the innermost gear wheel 412. A bracket 404 connects this gear wheel to the bicycle rear wheel 26, which is shown only fragmentarily, along with some of its spokes. The bicycle wheel rotates as indicated by the arrow V when the cycle moves in a forward direction. A support 450 connects the innermost gear wheel 412 to an outermost gear wheel 406 that is segmented with gates 452, in the same manner as the outermost front chain ring 152 discussed above. An intermediate gear wheel 462 is also shown, which is segmented with gates 464. Such an intermediate gear wheel is optional, as is a front intermediate chain ring 162, as discussed above.

For operation of the rear wheel embodiment, the driving zone is rearward of the gears, generally between the arrows $D_2$, which point generally toward each other. The free zone is generally forward of the gears, generally between the arrows $F_1$, and $F_2$, which point generally toward each other.

An actuator unit is provided as for the front chain ring embodiment, typically mounted adjacent the gear cassette, and generally forward of it, on the chain stay 174 or the seat stay 175, or both, as is convenient, depending on the locations of the stays, the amount of space therebetween, the size of the components, etc. As miniaturization trends continue to reduce the size of electronic components, more possibilities for locating the actuator unit will arise and be evident to those skilled in the art.

A rear wheel transmission component of the invention can be used alone, or, in combination with a similar front wheel transmission component of the invention. Furthermore, if either is used alone, it can be paired with a conventional derailleur on the other wheel, if desired, to either increase the spread of the gear ratios, or the number of gear ratios within a spread. Or both.

Because smaller rear gear wheels result in a higher gear, while a smaller front chain rings result in a lower gear, the considerations of up-shifting and down-shifting discussed above in connection with a front, chain ring embodiment, are reversed.

Mechanical Governor

Another variation is to use a mechanical governor, rather than an electronic one to measure the wheel speed and actuate the gates. For instance, a fly-ball type scissors mechanism can be arranged between the interlaced spokes of a rear wheel, which mechanism expands its diameter as the rotational velocity of the rear wheel increases, and contracts its diameter as the rotational velocity decreases. The changing effective diameter of the mechanism can be used to trip sensors that energize, or effectuate actuator motion. Typically, however, it has been found that mechanical governors are more complicated than are electronic controls, as discussed above.

Shift Based on Pedal Rotation

The embodiment discussed above uses the rotational speed of the rear wheel to determine when to shift. It is also possible to use the rotational speed of the pedals, by mounting a similar rotation marker 213 on the crank 11b, as shown in phantom in FIG. 3, with a speed sensor 211 mounted on the seat tube 177. In such an embodiment, care must be taken to accommodate times when the cyclist slows down or stops pedaling altogether, and simply coasts, as this can occur at both very fast and very slow speeds. It may be beneficial to monitor both the pedal speed and the wheel speed, and to make shifts based on a combination of the two.

Other Types of Cycles

Of course, a preferred use for the present invention is for bicycles. The invention can be supplied with new bicycles, and can easily be retrofitted to existing bicycles, simply by providing a segmented chain ring or rear gear cassette, along with an actuator set and control unit. There are also in use a large number of adult tricycles, used either by people who never learned how to ride a bicycle, or, for some reason are unable or prefer not to use a two wheeled cycle. The invention is applicable to such cycles, with suitable modification to be mounted on the somewhat differently configured frame elements. Similarly, four wheeled cycles exist, and can make use of the invention.

Other Types of Transmission Bands

Most known cycles use a linked metal roller chain for transmission, along with mating toothed gear wheels. It is also possible to use many different types of transmission bands, such as v-belts, flat and o-ring belt systems, timing belts, posidrive type belts, with a metal or synthetic fiber core, coated with a plastic, such as polyurethane, such as sold by SDP Stock Drive Products, of New Hyde Park, N.Y., ladder chains, synchromesh cable drives, beaded chains, etc. In general, the invention can be used with such systems. What is required is that the gates be shaped to engage the band when the gate is in the driving position, and also the gate must be such that it can be swung into position while in the free zone, without interfering with the band.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Many intermediate generalization combinations of the elements of the invention shown are possible, and are contemplated as part of the invention herein. For instance, the transmission element can be used on either the front, or the rear, or both. In either of these cases, the transmission band can be any of the types discussed. One or more than one variable configuration band ring or wheel can be used. The cam and linkage, or worm and worm gear embodiments can be used with any of the other described embodiments, front or rear position, etc. All of the foregoing combinations and variations can be used with two and three and four wheeled cycles. Furthermore, the applicants contemplate the invention to include not only a transmission for a cycle, such as may be retrofitted on existing bicycles and other cycles, but also an entire, automatic transmission bicycle, with a transmission that embodies the features and characteristics of the embodiments of transmissions disclosed herein.

The corresponding structures, materials, acts and equivalents of all means or step plus function elements in the claims below are intended to include any structure, material, or acts for performing the functions in combination with other claimed elements as specifically claimed.

Having described the invention, what is claimed is:

1. A transmission for a bicycle, the transmission comprising a variable configuration gear wheel, having components that move relative to each other from a first position to a second position, where, in said second position, said movable components engage a bicycle chain in a driving position, said movable component configured and arranged so that said relative motion takes place only in a free zone where said chain and movable components are free of each other.

2. The transmission of claim 1, said movable components arranged such that when any of said movable components engages said chain, said movable component is stationary relative to all except, at most, one other of said movable components.

3. The transmission of claim 1, said variable configuration gear wheel comprising a front chain wheel, said free zone comprising a zone behind said chain wheel, generally between and a rear wheel of said bicycle.

4. The transmission of claim 1, said variable configuration gear wheel comprising a rear sprocket wheel, said free zone comprising a zone ahead of said sprocket wheel, generally between it and a chain wheel of said bicycle.

5. The transmission of claim 1, said movable component being movable to said second position along a path having a component that is perpendicular to a plane in which said chain lies.

6. The transmission of claim 1, further comprising a mover mechanism to move each of said movable components from said first position to said second position.

7. The transmission of claim 6, further comprising a mover mechanism to move each of said movable components from said second position to said first position.

8. A cycle, comprising:
   a. a frame;
   b. front and rear wheels; and
   c. coupled to said frame, a transmission, comprising a variable configuration gear wheel, having components that move relative to each other from a first position to a second position, where, in said second position, said movable components engage a cycle chain in a driving position, said movable component configured and arranged so that said relative motion takes place only in a free zone where said chain and movable components are free of each other.

9. The cycle of claim 8, said variable configuration gear wheel comprising a front chain wheel, said free zone comprising a zone behind said chain wheel, generally between it and said rear wheel.

10. The cycle of claim 8, said variable configuration gear wheel comprising a rear sprocket wheel, said free zone comprising a zone ahead of said sprocket wheel, generally between it and said front wheel.

* * * * *

UNITED STATES PATENT AND TRADEMARK OFFICE
CERTIFICATE OF CORRECTION

PATENT NO. : 6,431,573 B1
DATED : August 11, 2002
INVENTOR(S) : Lerman et al.

It is certified that error appears in the above-identified patent and that said Letters Patent is hereby corrected as shown below:

<u>Title page, Item [54] and Column 1, line 3,</u>
Title, after the words "CYCLE HAVING SUCH", delete the word "AS" and insert therefore -- A --, so that the title reads:
-- **AUTOMATIC TRANSMISSION FOR A
 CYCLE, SUCH AS A BICYCLE, AND A
 CYCLE HAVING SUCH A TRANSMISSION** --

<u>Column 21,</u>
Line 15, after the word "between", insert -- it --, so that the line reads -- between it and a rear wheel of said bicycle. --

Signed and Sealed this

Eleventh Day of May, 2004

JON W. DUDAS
*Acting Director of the United States Patent and Trademark Office*